Sept. 17, 1968 E. J. HESS 3,401,793

TAPE HOLDING DEVICE

Filed March 23, 1965

*INVENTOR.*
EMIL JOHN HESS

United States Patent Office 3,401,793
Patented Sept. 17, 1968

3,401,793
TAPE HOLDING DEVICE
Emil John Hess, 130 W. 10th St., New York, N.Y. 10014
Filed Mar. 23, 1965, Ser. No. 442,123
2 Claims. (Cl. 206—53)

This invention relates to a tape (or film) holding device and more specifically, to a device for holding recording tape or movie film on a spool while providing means for holding the outer end of the tape or film.

Various mechanical arrangements have been used in the past to hold tape or film on a spool, however, most of the arrangements were complicated and relatively expensive to make.

Accordingly, it is the object of this invention to provide an improved device for holding tape or film on a spool.

This and other objects of this invention will become readily apparent from the following description and the drawings associated therewith.

Figure 1:
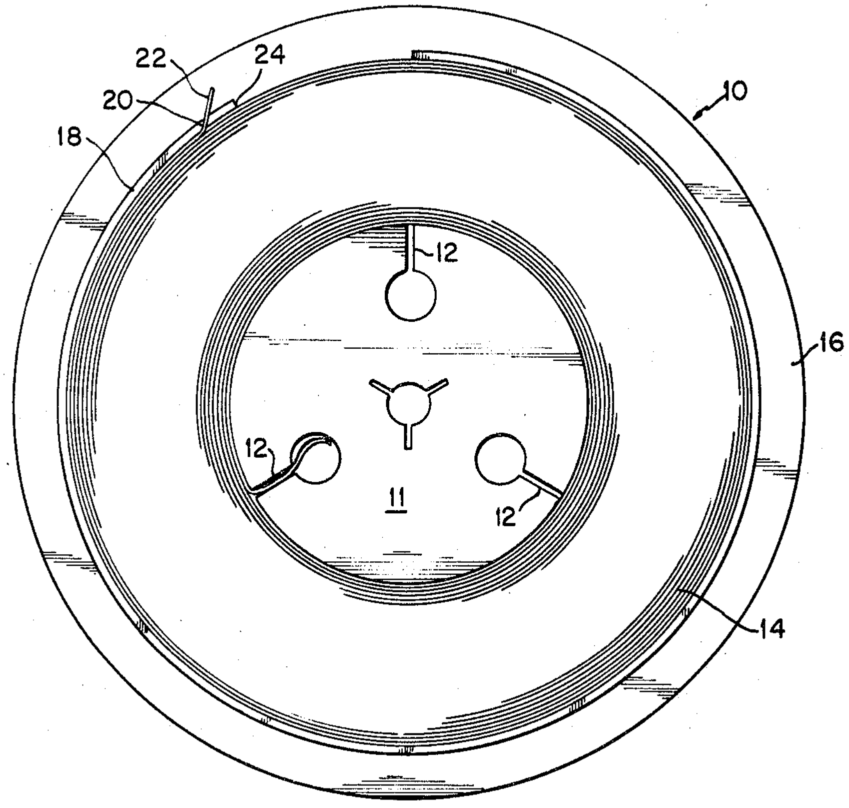
Figure 2:
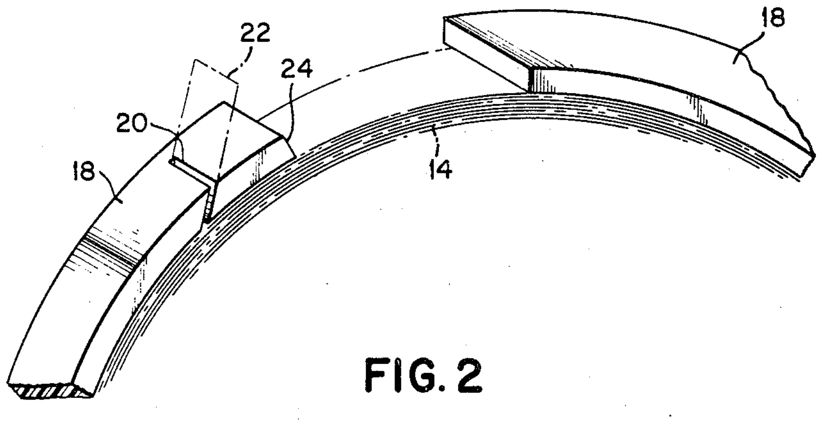

In the drawings: FIG. 1 is a perspective view of a spool and tape arrangement with one side removed to illustrate the tape holding device of this invention; and FIG. 2 is a perspective view of one portion of the tape holding device showing the slot means therein.

Briefly described, this invention relates to a tape or film holding device which comprises a split resilient ring having slot means for holding one end portion of a tape or film.

Referring to FIGURE 1, a spool 10 comprising a hub 11 preferably having slits 12 for the insertion therein of one end portion of a tape 14 is shown.

The tape 14 is coiled about the hub 11 and between two parallel circular discs attached to the hub 11 only one 16 of which is shown.

Located about the tape 14 is a tape holding device 18 which is preferably a split resilient ring having at least one slot 20 through which outside end portion 22 of the tape 14 extends. The slot 20, as shown clearly in FIG. 2, is located adjacent one end 24 of the split resilient ring 18. In this manner, the split resilient ring 18 which is preferably of any suitable rigid translucent plastic material, holds the entire tape 14 firmly on the hub 11 of the spool 10 and, in addition the slot 20 holds the end portion 22 of the tape 14 to facilitate loading onto a machine.

The slot 20 extends almost across the width of the translucent plastic ring 18, but is preferably sufficiently long enough to accommodate the width of the tape 14.

The split resilient ring 18 is thicker than the tape 14 and the slot 20 preferably extends at an angle across the thickness of the translucent plastic member or ring 18. In the embodiment of FIG. 1, the slot 20 forms an acute angle with the tape 14.

Many variations can be made of this invention and it is intended that the appended claims define the scope of this invention. It should be understood that the word tape as used in the claims includes recording tape and film.

I claim:

1. A tape holding device comprising, in combination, a split resilient ring having slot means for holding one end portion of a tape, said slot means comprising at least one transverse slot extending almost across the width of said split resilient ring, the length of said slot being substantially equal to the width of the tape end portion, in which said split resilient ring comprises a translucent plastic member having a thickness greater than the thickness of said tape, said transverse slot being located near the split portion of said ring, said slot extending at an angle across the thickness of said translucent plastic member.

2. A combination spool and tape holding arrangement comprising a spool having a tape wound thereabout, a split resilient ring located about said tape, and slot means located in said split resilient ring for holding one end portion of said tape, said slot means comprising at least one transverse slot extending almost across the width of said split resilient ring, the length of said slot being substantially equal to the width of the tape end portion, said spool comprises a hub and said split resilient ring holding the entire tape firmly on said hub, said ring comprises a translucent plastic member having a thickness greater than the thickness of said tape, said transverse slot located near the split portion of said ring, said slot extending at an angle across the thickness of said translucent member.

References Cited

UNITED STATES PATENTS

| | | | |
|---|---|---|---|
| 379,887 | 3/1888 | Crannell | 206—55 X |
| 1,468,636 | 9/1923 | Hoeft | 206—53 |
| 2,928,538 | 3/1960 | Mills | 206—53 |

FOREIGN PATENTS

| | | |
|---|---|---|
| 1,084,077 | 6/1934 | France. |
| 6,233 | 1898 | Great Britain. |
| 225,706 | 12/1924 | Great Britain. |

JOSEPH R. LECLAIR, *Primary Examiner.*
J. M. CASKIE, *Assistant Examiner.*